US006918162B2

(12) United States Patent  
Bodo

(10) Patent No.: US 6,918,162 B2
(45) Date of Patent: Jul. 19, 2005

(54) CLIP SYSTEM FOR FIXING AN ATTACHMENT TO A SUPPORT PART

(75) Inventor: Giuseppe Bodo, Vercelli (IT)

(73) Assignee: A. Raymond & CIE, Grenoble (FR)

( * ) Notice: Subject to any disclaimer, the term of this patent is extended or adjusted under 35 U.S.C. 154(b) by 0 days.

(21) Appl. No.: 10/433,220

(22) PCT Filed: Nov. 21, 2001

(86) PCT No.: PCT/EP01/13489
§ 371 (c)(1),
(2), (4) Date: May 30, 2003

(87) PCT Pub. No.: WO02/44570
PCT Pub. Date: Jun. 6, 2002

(65) Prior Publication Data
US 2004/0049893 A1 Mar. 18, 2004

(30) Foreign Application Priority Data
Nov. 30, 2000 (DE) .......................... 100 59 522

(51) Int. Cl.[7] .............. F16B 5/06; F16B 2/24; F16B 21/00; A44B 21/00
(52) U.S. Cl. .......................... 24/293; 24/295
(58) Field of Search .................. 24/293, 294, 295, 24/573.09, DIG. 31; 280/770

(56) References Cited

U.S. PATENT DOCUMENTS 2,329,688 A * 9/1943 Bedford, Jr. ............ 52/718.03
3,746,378 A 7/1973 Meyer ................ 287/189.36 R
4,630,338 A * 12/1986 Osterland et al. ............. 24/293
5,263,233 A * 11/1993 Kim et al. .................... 24/295
5,774,949 A * 7/1998 Cornell et al. ................ 24/293

FOREIGN PATENT DOCUMENTS

| DE | 619487 | 10/1935 |
| DE | 3245056 | 6/1984 |
| EP | 0855523 | 7/1998 |
| GB | 2135522 | 8/1984 |

* cited by examiner

Primary Examiner—Robert J. Sandy
(74) Attorney, Agent, or Firm—Gifford, Krass, Groh, Sprinkle, Anderson & Citkowski, P.C.

(57) ABSTRACT

A clip system for fixing an attachment to a support part is provided using a connecting clip (1) consisting of a resilient material. The connecting clip (1) can be clamped to a retaining rib (8) of the attachment (6) and can be inserted into an essentially rectangular orifice (9) of the support part (7). The connecting clip (1) has two springloaded limbs (3), which originate from a central segment (2) and are bent back on themselves, whose free ends (4) are bent outwards and backwards in such a way that when the external limbs (5) formed by the bend are introduced into the orifice (9), they are pressed together in a spring-loaded manner between the edges (10) and snap into the opening, thus securing the connecting clip (1) in a non-positive fit. Once the connecting clip (1) has been introduced into the orifice (9), additional tension is exerted on the claws (16) by the pressure of the external sprig-loaded limbs (5), thus further increasing the retaining force on the retaining rib (8).

9 Claims, 1 Drawing Sheet

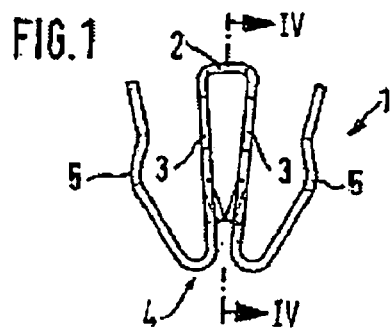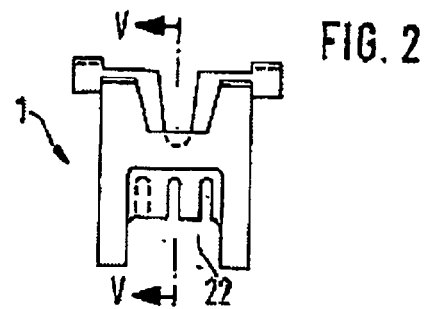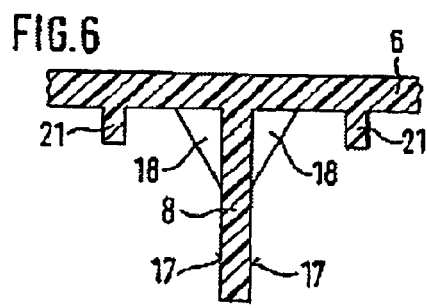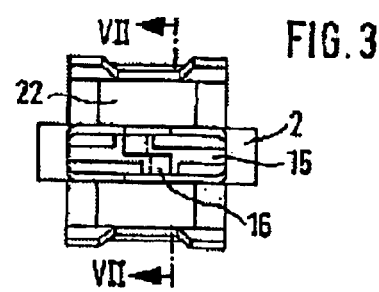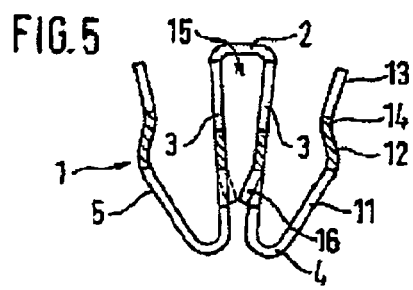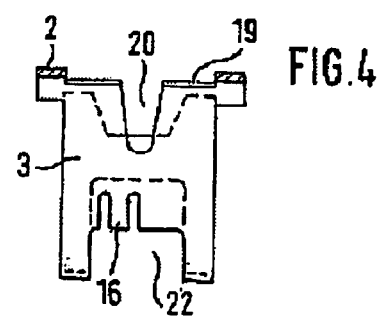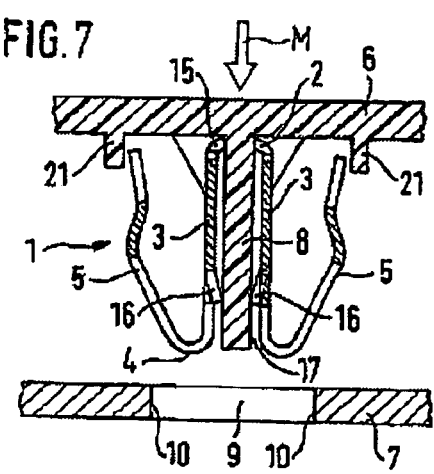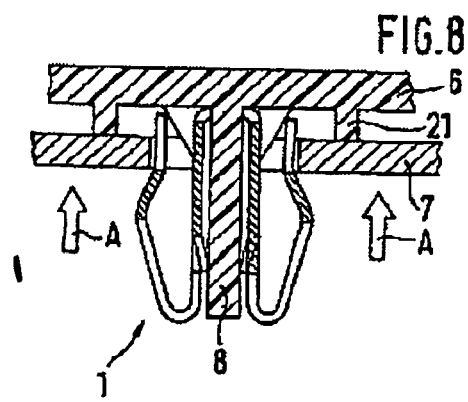

CLIP SYSTEM FOR FIXING AN ATTACHMENT TO A SUPPORT PART

RELATED APPLICATIONS

This application is the U.S. national phase of International Application No. PCT/EP01/13489 filed 21 Nov. 2001, which claims the benefit of German Application No. 100 59 522.7 filed 30 Nov. 2000.

FIELD OF THE INVENTION

The invention pertains to a clamp system for mounting an attachment part on a carrier part which comprises a connecting clamp of springable material, an attachment part and a carrier part with an opening, wherein this connecting clamp can be fixed on a holding rib of the attachment part and inserted into an essentially rectangular opening in the carrier part, wherein the connecting clamp is springably deformed during this insertion in such a way that the clamp is non-positively connected to the carrier part on the edges of this opening, and wherein the clamp has, in the unattached state, two spring limbs that are bent toward one another from a central web and provided with claws that are transversely bent toward one another and springably pressed against the lateral surfaces of the holding rib after its insertion.

BACKGROUND OF THE INVENTION

An elastic clamp of spring steel for the aforementioned purpose is known from DE 32 45 056 A1. This clamp comprises three limb pairs of different lengths which, beginning from a center line, are bent back toward one another in such a way that they form a rhombus when viewed from the side. The free ends of the limb pairs come in contact with one another in the unattached state of the clamp and are then angularly bent once again such that the attachment of the clamp on the holding rib of the attachment part is simplified. During this attachment, the free ends of the limb pairs are spread apart and pressed against the lateral surfaces of the holding rib. The two outer limb pairs of significantly shorter length are additionally provided with inwardly bent claws in their contact region on the holding rib in order to ensure the retention of the clamp on the holding rib.

The function of the clamp, namely the mounting of the attachment part on a carrier part, is realized with the longer central limb pair. In this case, the center width of the longer limb pair is greater than the corresponding clear width of the slot-shaped opening in the carrier part by a certain amount. When mounting the attachment part, its holding rib with the clamp attached thereon is inserted into the slot-shaped opening of the carrier part while elastically deforming the central limb pair, namely until the opposing obtuse regions of the limb pair lie behind the inner edge of the opening and the limb surfaces adjoin the inner edge after springing back.

The design of this clamp does not ensure a truly secure seat on the holding rib of the attachment part because it is merely held thereon by the inwardly directed pressing force of the limb pair. This is the reason why shorter lateral limb pairs with additional holding claws are provided. Since the holding claws generate a high resistance to being bent due to the relatively short length of the clamping limbs, a relatively high force is required for pressing the holding rib between the holding claws until it contacts the bottom of the clamp.

SUMMARY OF THE INVENTION

The invention is based on the objective of developing a versatile clamp system for connecting structural parts which allows a simple mounting process, wherein a truly secure seat of the clamp on the carrier part and thusly a secure connection between the structural part and the carrier part can be achieved with simple means.

According to the invention, this objective is attained due to the fact that, in the aforementioned clamp system known from, for example, EP-A-855 523, the free ends of the spring limbs are bent outward and rearward in such a way that the thusly formed outer limbs can be springably pressed together and engaged between the edges of the opening, and due to the fact that the central web contains a recess for inserting the holding rib.

Due to the design of the connecting clamp in accordance with the invention, the holding rib can be easily pressed through the recess between the claws, and the claws are additionally pressed against the side walls of the holding rib when the rearwardly bent spring limbs are pressed together during the insertion of the clamp into the opening of the carrier part. This means that the clamping effect of the claws is additionally intensified. In comparison with the above-cited state of the art, higher retention forces and an undoubtedly more secure seat of the clamp are achieved in this fashion.

This clamping effect is further intensified if the claws are arranged shortly before the free end of the spring limbs. Due to the utilization of the full bending length of the inner spring limbs, the claws can be easily spread apart and also pressed against the side walls of the holding rib with a greater force when the connecting clamp is inserted. This is because the additional pressing force originating from the locking edges is exerted upon a shorter limb length.

According to the invention, the inner spring limbs contain a slot that begins at their respective edges on both sides of the recess, wherein said slot serves for accommodating a correspondingly thick reinforcing rib between the structural part and the holding rib and thusly ensuring a stable contact between the connecting clamp and the holding rib.

The outer limbs are preferably formed of three sections that are alternately bent inward and outward at obtuse angles such that the bending line between the second and the third section forms a locking groove for the locking edges of the opening. In this manner, the flexibility of the first section can be advantageously increased when this section contains an essentially rectangular recess that extends beyond the roundly bent end. The remaining narrow spring webs provide the first section of the spring limbs with a higher elasticity such that the connecting clamp can be inserted into and, if so required, pulled out of the opening in the carrier part more easily.

BRIEF DESCRIPTION OF THE DRAWINGS

One embodiment of the clamp system according to the invention is illustrated in the figures and described in greater detail below. The figures show:

FIG. 1, a side view of a preferred embodiment of the connecting clamp used in the present clamp system;

FIG. 2, a front view of the same connecting clamp;

FIG. 3, a top view of the same connecting clamp;

FIG. 4, a section through the connecting clamp along the line IV—IV in FIG. 1;

FIG. 5, a section through the connecting clamp along the line V—V in FIG. 2;

FIG. 6, a detail of an attachment part with a holding rib that is aligned for its insertion into the connecting clamp;

FIG. 7, a section through the connecting clamp fixed on the holding rib along the line VII—VII in FIG. 3, wherein the connecting clamp is aligned for its insertion into the mounting opening of a carrier part, and FIG. 8, an illustration analogous to that shown in FIG. 7, however, after connection between the attachment part and the carrier part is produced in accordance with the invention.

DETAILED DESCRIPTION OF THE INVENTION

The present clamp system is operative to mount an attachment part 6 on a carrier part 7 by a connecting clamp 1 that can be fixed on a holding rib 8 of the attachment part 6. The fixed connecting clamp 1 is then inserted into an essentially rectangular opening 9 in the carrier part 7. During this process, the connecting clamp 1 is deformed in such a way that the clamp 1 is non-positively engaged with the carrier part 7 on the edges 10 of the opening 9.

FIGS. 1–4 show that the connecting clamp 1 is manufactured of an originally rectangular spring steel sheet, wherein the connecting clamp 1 has, in the unattached state, two spring limbs 3 that are bent toward one another from a central web 2. These spring limbs nearly contact one another on their free ends 4 and are then bent outward and rearward in such a way that the outer limbs 5 form a wedge-shaped profile in the side view as shown in FIG. 1.

FIG. 5 shows that the outer spring limbs 5 consist of three sections, wherein the first section 11 is bent outward at an acute angle from the lower free end 4. The second, central section 12 is bent inward at an obtuse angle, and the third section 13 is bent outward at an obtuse angle. In this case, the bending line between each second section 12 and third section 13 forms a locking groove 14 that adjoins and engages with the locking edges 10 of the opening 9 in the carrier part 7 after inserting the connecting clamp 1 into this opening.

In order to securely and durably connect the connecting clamp 1 to the attachment part 6, the latter comprises a holding rib 8, wherein the central web 2 of the connecting clamp 1 contains a recess 15, the clear dimensions of which correspond to the cross section of the holding rib 8. In addition, claws 16 are transversely bent toward one another and positioned shortly before the lower end 4 of the spring limbs 3, wherein said claws springably adjoin the lateral surfaces 17 of the holding rib 8.

The holding rib 8 is centrally supported relative to the attachment part 6 on both sides by a triangular reinforcing rib 18. The inner spring limbs 3 each contain a slot 20 that originates at their edges 19 on both sides of the recess 15, wherein said slots are operative to accommodate the reinforcing ribs 18 after inserting the holding rib 8 into the connecting clamp 1.

Support ribs 21 are also integrally formed onto the attachment part 6 on both sides of the holding rib 8, wherein said support ribs are spaced apart from the holding rib and simultaneously adjoin the carrier part 7 when the locking groove 14 engages with the opening 9. This means that these support ribs act as spacers between the carrier part 7 and the attachment part 6. The distance between the two support ribs 21 is such that the upper sections 13 of the outer spring limbs 5 have sufficient space between the support ribs 21 after the insertion of the holding rib 8 in the non-tensioned state of the connecting clamp 1.

In order to make the first section 11 of the spring limbs 5 as elastic as possible, the first section 11 contains an essentially rectangular cutout 22 that extends into the inner spring limbs 3 beyond the roundly bent end 4.

FIGS. 5–8 elucidate the effect of the clamp system according to the invention. The holding rib 8 of the attachment part 6 is initially inserted from the top into the recess 15 of the central web 2 in the direction of the arrow "M" and pressed downward between the spring limbs 3 and the claws 16 until the attachment part 6 contacts the central web 2 (FIG. 7). The carrier part 7, with its opening 9, is pressed over the connecting clamp 1 in the direction of the arrows "A." During this process, the outer spring limbs 5 are initially pressed together and then spring back apart again after the central section 12 passes through the opening 9. Pressure is applied until the locking groove 14 engages with the edges 10 and the support ribs 21 of the attachment part 6 lie on the carrier part 7 (FIG. 8).

What is claimed is:

1. Clamp system for mounting an attachment part on a carrier part, comprising: a connecting clamp (1) of springable material, an attachment part (6) and a carrier part (7) with an opening (9), wherein the connecting clamp (1) can be fixed on a holding rib (8) of the attachment part (6) and inserted into the opening (9) in the carrier part (7), wherein the connecting clamp is springably deformed during the insertion in such a way that the clamp (1) is non-positively connected to the carrier part (7) on the edges (10) of the opening (9), and the clamp (1) has, in the unattached state, two inner spring limbs (3) that are bent toward one another from a central web (2) and provided with claws (16) that are transversely bent toward one another and springably pressed against the lateral surfaces (17) of the holding rib (8) after its insertion, and the lower free ends (4) of the inner spring limbs (3) are bent outward and rearward to form outer spring limbs (5) that can be springably pressed together and engaged between the edges (10) of the opening (9), and the central web (2) contains a recess (15) for inserting the holding rib (8).

2. Clamp system according to claim 1, wherein the claws (16) which are transversely bent toward one another are arranged shortly before the free end (4) of the inner spring limbs (3).

3. Clamp system according to claim 1, wherein the inner spring limbs (3) respectively contain a slot (20) that originates at their edges (19) on both sides of the recess (15), wherein said slots serve for accommodating a correspondingly thick reinforcing rib (18) between the attachment part (6) and the holding rib (8).

4. Clamp system according to claim 1, wherein the outer spring limbs (5) consist of three sections, wherein a first section (11) is bent outward at an acute angle from the lower free end (4), a second section (12) is bent inward at an obtuse angle and a third section (13) is bent outward again at an obtuse angle, and wherein the bending line between the second section (12) and the third section (13) forms a locking groove (14) for the locking edges (10) of the opening (9).

5. Clamp system according to claim 4, wherein the first section (11) contains a rectangular cutout (22) that extends beyond the lower free end (4).

6. Clamp system for mounting an attachment part on a carrier part, comprising a connecting clamp of springable material, an attachment part and a carrier part with an opening, wherein the connecting clamp is fixable on a holding rib of the attachment part and inserted into the opening in the carrier part, and wherein the connecting clamp is springably deformed during this insertion in such that the clamp is non-positively connected to the carrier part on the edges of the opening, and wherein the clamp has, in the unattached state, two inner spring limbs that are bent toward one another from a central web and provided with claws that are transversely bent toward one another and springably pressed against the lateral surfaces of the holding rib after its insertion, and wherein lower free ends of the inner spring limbs are bent outward and rearward to form outer spring limbs that can be springably pressed together and engaged between the edges of the opening, and by the fact that the central web contains a recess for inserting the holding rib, the outer spring limbs having a first section bent outward at an acute angle from the lower end, a second section bent inward at an obtuse angle and a third section bent outward again at an obtuse angle, the bending line between the second section and the third section forming a locking groove for the locking edges of the opening.

7. Clamp system according to claim 6, wherein the first section contains a rectangular cutout that extends beyond the lower free end.

8. Clamp system according to claim 6, wherein the claws which are transversely bent toward one another are arranged shortly before the free end of the inner spring limbs.

9. Clamp system according to claim 6, wherein the inner spring limbs respectively contain a slot that originates at their edges on both sides of the recess, wherein said slots serve for accommodating a correspondingly thick reinforcing rib between the attachment part and the holding rib.

* * * * *